United States Patent [19]

Price

[11] Patent Number: 4,496,797
[45] Date of Patent: Jan. 29, 1985

[54] CIRCUIT FOR AUTOMATICALLY CONNECTING AND DISCONNECTING A SPEAKERPHONE TO A TELEPHONE LINE

[75] Inventor: John W. Price, Millstadt, Ill.

[73] Assignee: AT&T Technologies, Inc., New York, N.Y.

[21] Appl. No.: 537,234

[22] Filed: Sep. 29, 1983

[51] Int. Cl.³ ............................................. H04M 1/64
[52] U.S. Cl. ............................... 179/81 B; 179/6.15; 179/6.16
[58] Field of Search ................. 179/100 L, 6.13, 6.14, 179/6.15, 6.16, 6.03, 88, 81 R, 81 B, 99 LC, 99 LS, 18 FA, 18 HB, 84 R, 5 P, 2 A, 2 AM

[56] References Cited

U.S. PATENT DOCUMENTS 3,041,411  6/1962  Beatty ............................... 179/81 B
4,049,916  9/1977  Danner .......................... 179/84 R X

*Primary Examiner*—Gene Z. Rubinson
*Assistant Examiner*—James L. Dwyer
*Attorney, Agent, or Firm*—R. P. Miller; M. de Picciotto

[57] ABSTRACT

A pair of optical isolator circuits (18, 56) associated with a subscriber's telephone line are utilized to automatically connect and disconnect a speakerphone to the telephone line. Receipt of each calling ringing signal operates the first optical isolator (18) and a first one shot multivibrator (28) to generate and apply counting pulses to a counter (37). Upon receipt of a predetermined count, the counter acts to energize a relay (51) to connect the speakerphone and the second monitoring optical isolator to the telephone line. Upon either party going "on hook" at the completion of the call, the second monitoring optical isolator (56) is interrupted which results in the operation of a second one shot multivibrator to generate a pulse to reset the counter whereupon the relay is released to disconnect the speakerphone and the second monitoring optical isolator from the telephone line.

7 Claims, 1 Drawing Figure

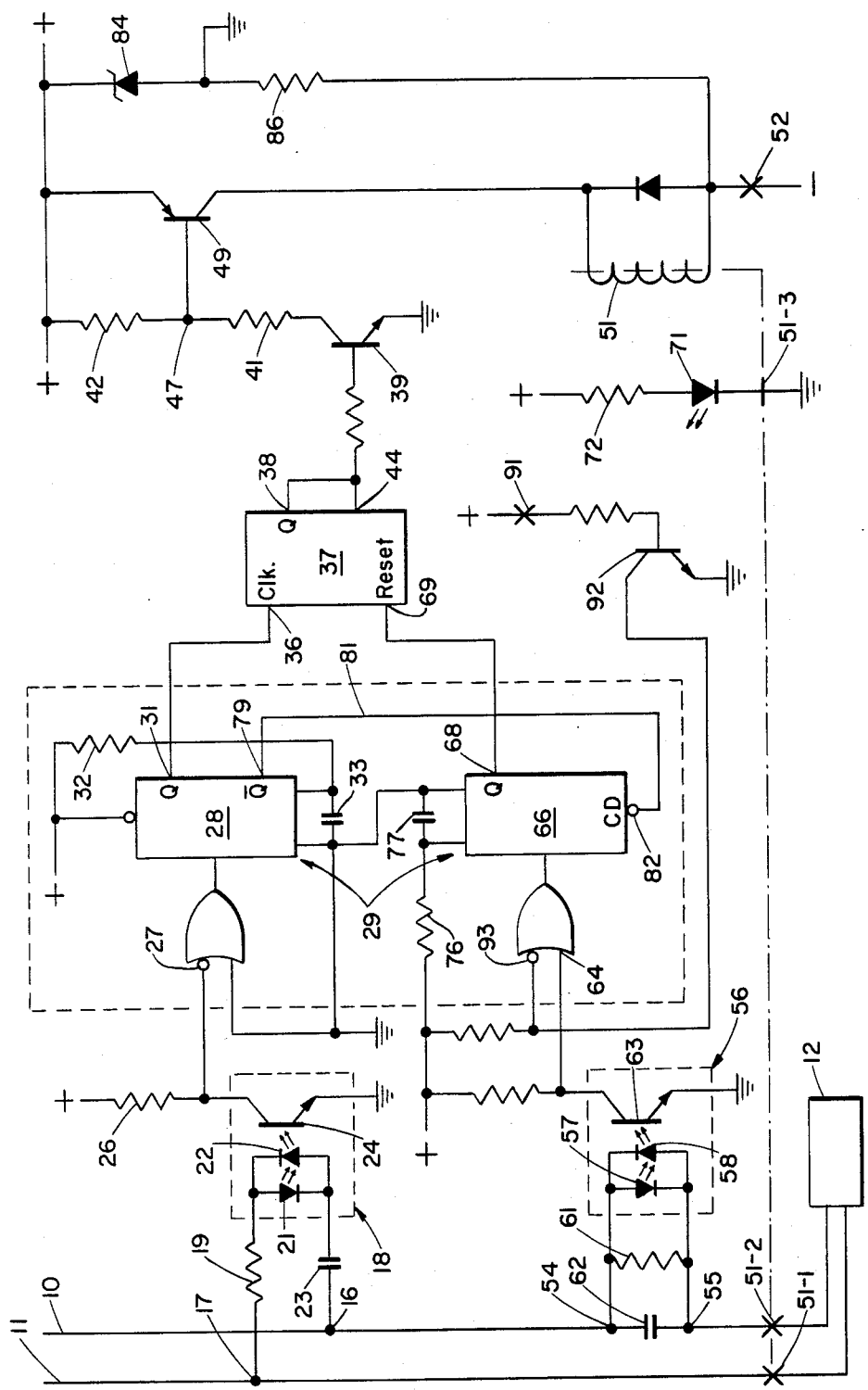

CIRCUIT FOR AUTOMATICALLY CONNECTING AND DISCONNECTING A SPEAKERPHONE TO A TELEPHONE LINE

FIELD OF THE INVENTION

This invention relates to a telephone circuitry responsive to a predetermined number of ringing signals for connecting a speakerphone or other device to a telephone line, and more particularly, to a system using optical isolators for sensing ringing and talking path conditions to connect and disconnect the speakerphone to and from the telephone line.

BACKGROUND OF THE INVENTION

Prevailing usage of the telephone system requires the implementation of more automatic facilities that enable the subscriber to maximize utilization of the telephone system in conjunction with diverse automatic equipments with a minimum degree of human intervention. Various facilities are available to automatically couple called subscriber equipments to the telephone line. One such commonly used facility is the telephone answering and recording device which is automatically coupled to the telephone line by transmission of a predetermined number of ringing signals. In one of these systems, as shown in U.S. Pat. No. 4,049,916, issued Sept. 20, 1977 to D. W. Danner, ringing signals impressed on the usual tip and ring leads are subsequently detected and applied to operate a first optical isolator to generate a series of pulses which operate a counter. Upon registering a predetermined count, the automatic answering and recording device is operated to provide an announcement or instruction message followed by the actuation of a recording device to record the calling party's message. A second optical isolator circuit is used to monitor a C-lead from the telephone central office. If a message has been recorded, and the subscriber goes off-hook, the monitored condition of the C-lead is used to control the operation of a tone signal generator which is effective to impress a distinctive tone signal on the subscriber's line apprising the subscriber that a message is recorded in the answering equipment.

In other automatic telephone connect systems, a speakerphone may be connected to a telephone loop circuit without the calling parties going off-hook. One such system is exemplified by U.S. Pat. No. 3,041,411, issued June 26, 1962 to D. C. Beatty, wherein receipt of a ringing signal connects a microphone and a speaker to the telephone circuit for a predetermined time set by a number of capacitors. If sound carrying electrical surges are not impressed by the speaker on the loop, the speaker microphone is automatically disconnected. Further, this system may be disconnected whenever the calling party replaces their telephone handset to the "on-hook" position. An interrupt may also be initiated by the called party depressing a push button control switch.

SUMMARY OF THE INVENTION

This invention contemplates, among other things, a combination of optical isolators and logic circuits for automatically connecting a speakerphone or similar device to a telephone line upon receipt of a predetermined number of ringing signals and for automatically resetting the logic circuits and disconnecting the speakerphone upon either party going "on-hook".

More particularly, the invention features an optical isolator circuit for generating pulses in response to telephone ringing signals and applying the pulses to successively operate one stage of a dual monostable multivibrator. The output multivibrator pulses are impressed on a counting circuit which after a predetermined count produces a signal to operate a relay. Operation of the relay effectuates a connection of a speakerphone or other device to the telephone line and also functions to connect a second or monitoring optical isolator to the telephone line.

Upon interruption of the telephone line caused by either party going "on-hook", there is a momentary interruption of the telephone line current that is effective to interrupt operation of the second optical isolator. Interruption of the second optical isolator causes a positive going pulse to be applied to the second stage of the monostable vibrator which responds to produce a reset pulse that is applied to the reset counter thereby interrupting operation of the relay controlling the maintenance of the speakerphone on the telephone line. This operation of the second stage of the monostable vibrator is also effective to impress a blocking signal to the first stage of the multivibrator to prevent a response to ringing pulses or transients impressed on the telephone line due to the opening of the relay contacts.

DESCRIPTION OF THE DRAWING

Other advantages and features of the invention will be apparent upon consideration of the following detailed description in conjunction with the drawing which illustrates in a single FIGURE a circuit for selectively connecting a speakerphone or other telecommunication device to a telephone line embodying the principles of the present invention.

DETAILED DESCRIPTION

The automatic connect and disconnect circuit of the present invention is designed to detect A.C. ringing signals on a telephone line consisting of tip and ring leads 10 and 11 and after a programmed predetermined number of ringing cycles a logic circuit facility functions to connect a device, such as a speakerphone 12, across the tip and ring leads. A portion of the logic circuit is enabled during the subsequent conversation between the parties and, upon either party going "on hook" to interrupt the communication path, the enabled circuitry functions to reset the other portions of the circuitry to a standby condition in anticipation of the next call.

More particularly, each A.C. pulse consisting of ringing tone burst is applied from tip and ring terminals 16 and 17 to a ringing detector circuit 18 comprising a resistor 19, a pair of oppositely connected parallel light emitting diodes 21 and 22 of a first optical isolator and a capacitor 23. Resistor 19 acts to limit the current applied to the light emitting diodes while the capacitor 23 provides D.C. isolation so that the detector circuit 18 only responds to A.C. ringing signals. The optical isolator detector circuit 18 further includes an NPN silicon photo-transistor 24 having a collector connected through a load resistor 26 to a regulated source of positive battery and an emitter connected to ground. Each ringing signal drives the photo-transistor 24 to conduction whereupon the collector potential drops to apply a discrete negative or logic 0 pulse to an input port 27 of a first stage 28 of a dual retriggerable/resettable monostable multivibrator 29. The negative transition of the logic 0 pulse appearing at port 27 results in the triggering of the first stage of the multivibrator to provide a single positive going pulse at a Q output port 31. During the silent interval between application of ringing signals, the photo-transistor 24 is cut-off so that the input at port 27 reverts to a high or logic 1 condition. The period of operation of the first stage of the multivibrator 29 is controlled by the values of a resistor 32 and a capacitor 33 which are selected so that this stage of the multivibrator times out during the silent interval between successive tone bursts of ringing signals. In effect, the operation of the first stage of the multivibrator produces a single positive going logic 1 pulse at output 31 for each ringing tone burst impressed on the ringing circuit. Logic 1 output pulse is impressed on a clock input 36 of a decade counter 37.

The decade counter counts each clock input pulse generated in response to each ringing tone burst and sequentially produces a series of positive going or logic 1 outputs on a succession of output pins which are initially set at logic 0. Only one of the output pins is shown in the drawing and is designated by the reference numeral 38. When the decade counter counts the receipt of a predetermined number (e.g., 3) of pulses applied to the input 36, the condition of output pin 38 goes from logic 0 to logic 1 to impress a positive going pulse to the base of an NPN transistor 39. Transistor 39 includes an emitter connected to ground and a collector connected through voltage divider resistors 41 and 42 to the regulated source of positive potential. The positive or logic 1 condition at output 38 is also applied to an enable pin 44 to interrupt further advancement of the decade counter so that no further input pulses are accepted until the counter is reset. When transistor 39 conducts, the voltage at a junction 47 between resistor 41 and 42 goes low to drive the base of a PNP transistor 49 negative placing the transistor in a conductive state. The conduction of transistor 49 completes a circuit from the positive voltage source through the transistor through an operating coil of a relay 51 and a manually operated switch 52 to a negative battery source.

When the relay 51 is energized, associated contacts 51-1 and 51-2 close to connect the telephone line to the control device 12; e.g., a speakerphone. Closure of these relay contacts allows the telephone line loop current to flow through terminals 54 and 55 connected to a second monitoring optical isolator 56 which includes a second pair of oppositely connected parallel light emitting diodes 57 and 58. A resistor 61, connected in parallel with the second pair of light emitting diodes, limits current flow to an acceptable level while a capacitor 62, connected between terminals 54 and 55, functions to filter line transients and noise. Conduction of the light emitting diodes energize a second NPN photo-transistor 63. Conduction of the transistor 63 causes a consequential drop in collector potential that is applied as a logic 0 condition to an input 64 of a second stage 66 of the dual monostable multivibrator 29. The second stage 66 of the multivibrator is only triggered in response to a positive going logic 1 pulse to the input 64 thus the negative drop in collector potential of transistor 63 is ineffective, at this time, to operate the second stage of the multivibrator. It will be noted that a $\overline{Q}$ output 68 of this stage of the multivibrator is at logic 0 which is applied to a reset input 69 of the decade counter 37 thereby permitting the counter to respond to the input pulses applied to the input pin 36. Counter 37 will only reset when the reset input 69 is driven high to logic 1 and will count only when both the reset input and the count enable input 44 are at logic 0. Energization of relay 51 also opens contacts 51-3 to disrupt a normally energized circuit running through a light emitting diode 71 and a current limiting resistor 72 to the regulated positive battery source. When illuminated, the light emitting diode 71 indicates that the circuits are in a standby condition. When extinguished, the called party is apprised that the speakerphone is connected to the telephone line.

When the call is terminated by either the calling or called party going "on hook", there is a momentary interruption of the telephone line loop current which extinguishes the monitoring optical isolator diodes 57 and 58 to cut-off the photo-transistor 63. This cut-off results in a consequent rise in collector potential that is applied as a positive going or logic 1 pulse to the input 64 of the second stage 66 of the monostable multivibrator. The second stage of the multivibrator is thereby triggered into a cycle of operation and drives the Q output 68 to a positive or logic 1 condition that is impressed on the reset input 69 to reset the counter 37 to an initial 0 count condition. The period of cyclic operation of the second stage of the multivibrator is determined by a RC timing network consisting of a resistor 76 and a capacitor 77. This period of operation is set so that the logic 1 condition on output 68 is of sufficient duration to permit the decade counter to reset.

When the decade counter 37 resets, both the $\overline{Q}$ output 38 and enable pin 44 go low to logic 0 thus causing cessation of the energization of the transistors 39 and 49 and a consequent interruption of the operation of the relay 51. The de-energization relay 51 opens contacts 51-1 and 51-2 to disconnect the speakerphone from the telephone line. The energization of the relay 51 is also accompanied by the reclosure of the contacts 51-3 to operate the light emitting diode 71 and thus apprise the called party that the call is terminated and the circuitry is in a standby condition in anticipation of the next call.

A normally high logic 1 at a complimentary $\overline{Q}$ output port 79 of the first stage 28 of the multivibrator is cross connected by a lead 81 to a clear direct input 82 of the second stage. When the $\overline{Q}$ output port 79 goes to logic 0 during the receipt of the ringing tone signal, the clear direct input 82 is held at logic 0 forcing the output 68 to remain at logic 0 and thus preventing the second stage 66 of the multivibrator from producing a reset pulse at Q output 68 in response to either the ringing signals or transients due to contact bounce when relay 51 operates. It may be thus appreciated that a logic 1 state at the $\overline{Q}$ output 79 of the first multivibrator is applied to the clear direct input 82 to condition the second multivibrator 66 for operation in response to a deenergization of the second optical isolator.

A zener diode 84 and a resistor 86 are connected to the voltage source to establish a regulated voltage for the various logic circuit devices. The manual push button switch 52 is provided in the regulated power circuit to enable the subscriber to disconnect the automatic answer facility.

A manual reset circuit is also provided to reset the counter and the receiving circuit if there is a delay in the opening of the telephone line 10-11 due to a delay in operation of an associated PBX equipment or a line fault or trouble. This circuit includes a normally open reset switch 91 which, when closed, completes an energizing circuit for a NPN transistor 92 whereupon the accompanying drop in collector potential is impressed on a second input port 93 of the second stage 66 of the multivibrator 29. The output 68 of the second stage 66 switches to a logic 1 to impress a reset pulse on the reset input 69 of the counter 37 to place the overall circuit in a reset condition. It may be appreciated that the subscriber's set is immediately placed in condition to receive the next call.

What is claimed is:

1. A circuit for connecting a telecommunication device to a subscriber telephone line, which comprises:
   a first optical isolator connected across the telephone line for generating discrete pulses in response to A.C. ringing pulses;
   a first one shot multivibrator having an input port responsive to each discrete pulse for generating a counting pulse at an output port;
   a counter circuit connected to said multivibrator output port and responsive to a predetermined number of said counting pulses for generating a control pulse;
   a normally unoperated relay having contacts in the telephone line for connecting the telecommunication device to the telephone line;
   means responsive to said control pulse for operating said relay to connect the telecommunication device to the subscriber's telephone line;
   a second optical isolator circuit having a pair of terminals connected in the subscriber's line and energized upon closure of said relay contacts for monitoring current flow in the telephone line;
   a second one shot multivibrator having an input port connected to said second optical isolator and responsive to said optical isolator being deenergized in response to an interruption of current flow in the telephone line for generating a reset pulse; and
   means for applying said reset pulse to reset said counter circuit to a zero count condition.

2. A circuit as defined in claim 1, which includes:
   a capacitor connected in the telephone line between the optical isolator terminals connected in the subscriber's line for filtering line transients and preventing interruption of operation of the optical isolator in response to transient or noise signals.

3. A circuit as defined in claim 1 which comprises:
   a timing circuit in said first one shot multivibrator set to time out in the period between applications of said discrete pulses generated in response to the A.C. ringing pulses.

4. A circuit a defined in claim 1 which comprises:
   means for applying an output from the first multivibrator during generation of each counting pulse to the second multivibrator for holding the second multivibrator from producing an output as a result of ringing signals or contact bounce when said relay operates.

5. A circuit as defined in claim 1, which comprises:
   means coupling a second complementary output of said first multivibrator to a clear input of said second multivibrator for conditioning said second multivibrator to respond to the deenergization of said second optical isolator.

6. A circuit for automatically connecting a receiving device to a telephone line having tip and ring wires, which includes:
   means connected across the tip and ring wires responsive to each ringing signal on the telephone line for generating a first negative going pulse;
   a monostable multivibrator having two stages each having operating input responsive to a negative going pulse for producing a positive going output;
   means for applying said first negative going pulse to the first stage of said monostable multivibrator to produce a first positive going pulse;
   a counter responsive to each first positive going pulse for registering a count and for producing a second positive going pulse upon registering a predetermined number of counts;
   a relay having normally open contacts interconnected between the receiving device and the telephone line;
   means responsive to said second positive going pulse for operating said relay to connect the receiving device to the telephone line;
   means connected in the tip wire to respond to an interruption of the current in the telephone line for generating a second negative going pulse;
   means for applying said second negative going pulse to the input of second stage of said monostable multivibrator to produce a third positive going pulse; and
   means for applying said third positive going pulse to reset said counter and interrupt operation of said relay to disconnect the receiving device from the telephone line.

7. A circuit for selectively connecting a telephone line to a speakerphone which includes:
   a first opto-isolator circuit responsive to each ringing signal impressed on the telephone line for generating a first trigger signal;
   a first one shot multivibrator having a period of operation less than the duration of the time between successive ringing signals;
   means for applying each trigger signal to said first multivibrator to generate a count signal;
   a counter circuit responsive to a predetermined number of count signals for producing a control signal;
   means responsive to said control signal for connecting the speakerphone to the telephone line to establish a current path to the speakerphone;
   a second opto-isolator circuit energized by the establishment of said current path for producing an output voltage and responsive to an interruption of said current path for terminating said output voltage; and
   a second one shot multivibrator responsive to the termination of said output voltage for resetting said counter circuit to disconnect the speakerphone from the telephone line.

* * * * *